UNITED STATES PATENT OFFICE.

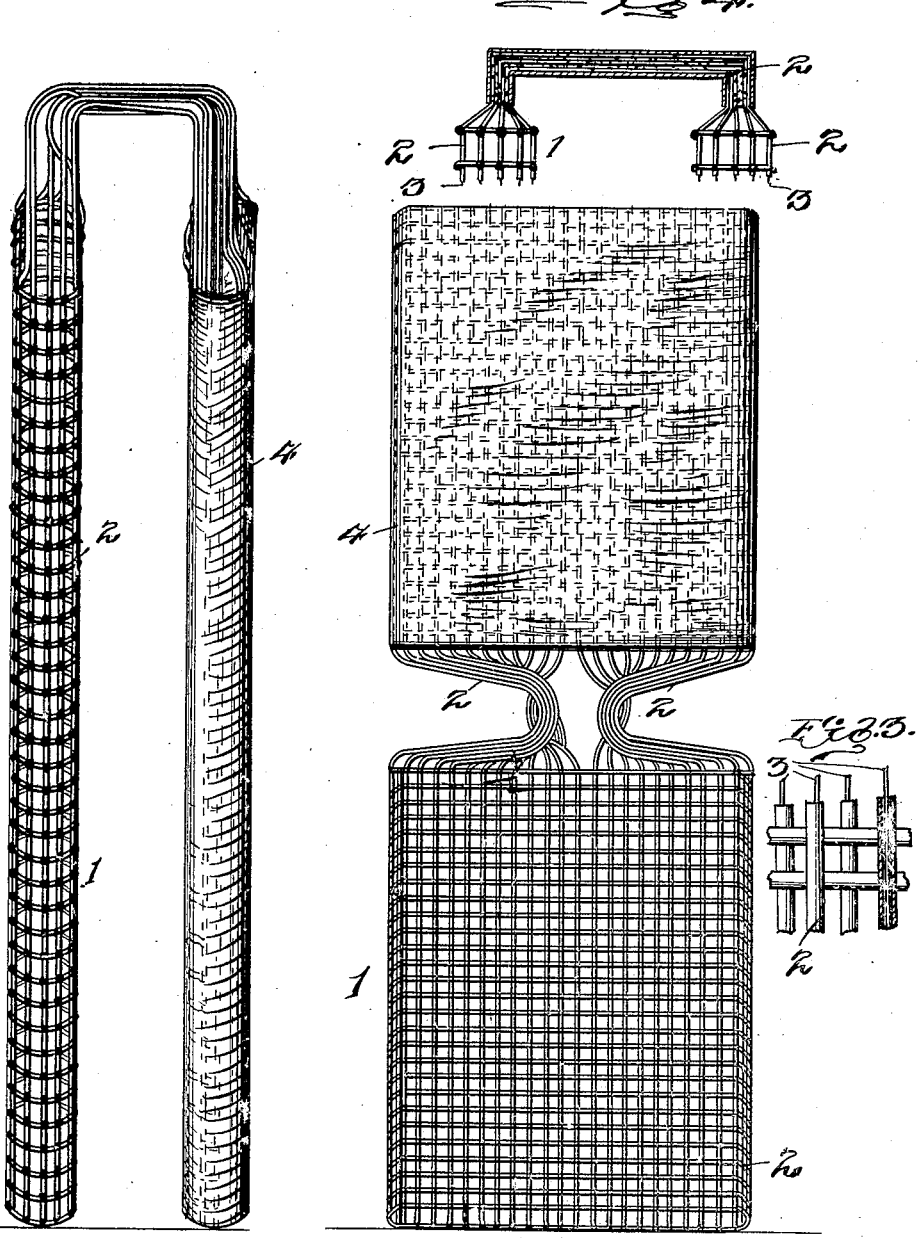

FRANCIS M. MICHAEL, OF EATON, OHIO.

GRID FOR STORAGE BATTERIES.

969,387.   Specification of Letters Patent.   Patented Sept. 6, 1910.

Application filed April 1, 1910. Serial No. 552,777.

*To all whom it may concern:*

Be it known that I, FRANCIS M. MICHAEL, a citizen of the United States of America, residing at Eaton, in the county of Preble and State of Ohio, have invented certain new and useful Improvements in Grids for Storage Batteries, of which the following is a specification, reference being had therein to the accompanying drawing.

This invention relates to electrical storage batteries, and has especial reference to grids for storage batteries.

This invention has for its object to provide an improved double grid for storage batteries so constructed as to greatly reduce the weight of the grid.

This invention further has for its object to provide an improved double grid for storage batteries, by means of which the voltage and amperage will be greatly increased.

The invention broadly contemplates an improved double grid in the form of two wire baskets, which are formed of interwoven small hollow tubes, each having a central conducting wire, the said several central conducting wires being accumulated at a single point in the grid and formed into a solid cable which connects the two basket-shaped grids together and is inclosed in a tube and embedded in a felting in said tube. Each basket-shaped grid so constructed is filled with a lead paste compound, or other suitable filling which is spread through the network walls of the grid to form an external coating therefor.

Referring to the accompanying drawings,—Figure 1 is an enlarged view in elevation showing the edge portion of a pair of grids connected together and constructed in accordance with this invention, one of said grids being filled with a compound and the other not. Fig. 2 is a side view in elevation of the pair of grids shown in Fig. 1, in extended position. Fig. 3 is an enlarged detail view, partly in section and broken away, of a portion of the basket construction of the grid. Fig. 4 is a detail sectional view showing the means for connecting the two grids.

In carrying out the invention, a basket-shaped grid, 1, is provided, which is formed of interwoven small tubes or hollow wires, 2, each of said wires or tubes 2 being formed of lead or an alloy of lead and containing a central conducting wire 3, of non-corrosive material, the several central conducting wires being accumulated at one end of the electrodes, where they may be twisted into a solid cable and made solid with melted lead alloy.

As shown in Figs. 1 and 2, I have shown two grids constructed in accordance with this invention, which are folded into parallel position, as shown in Fig. 1, to be placed in a cell. The basket grid, so constructed, is filled with the lead paste compound or other suitable filling, which passes through the network of the grid and forms a coating, 4, therefor.

In the double form of grid shown herein, with one end positive and the other end negative, only two of such grids coupled together may be used in a cell for light work, and need have no supporting pillars. The central wire in the hollow tubes of lead and antimony is a good conductor, and is non-corrosive, and without the possibility of any effect from the electrolyte that will make possible the rapid charge or discharge of the elements.

By means of the tubular network construction as herein set forth, a very light grid is provided, by means of which the voltage and amperage is greatly increased. All central wires run to a channeled tube or connecting binder between cells, and filled with an alloy of lead, which tube may receive any number of positive or negative plates. The central wires are twisted and soldered together before the tube is filled thus making a continuous wire.

Having described the invention, I claim:

A double grid of the character described, each grid being the shape of a basket formed of a network of hollow wires interwoven together, each of said wires have a central conducting wire extending through said tube, and accumulated at one end of each grid, and connecting two grids together, a lead paste compound filling each grid and forming a coating for the same, and a channel tube provided with depending ends inclosing bunched wires connecting the two grids, said wires being soldered together, and said tube being filled with an alloy of lead.

In testimony whereof I hereunto affix my signature in presence of witnesses.

FRANCIS M. MICHAEL.

Witnesses:
    GEO. BRUMLAUGH,
    S. B. FOOS,
    C. C. FOOS.